UNITED STATES PATENT OFFICE.

ALBRECHT SCHMIDT, OF BERLIN, GERMANY.

PROTOCATECHUIC ALDEHYDE-META-ALKYL-ETHERS AND PROCESS OF MAKING SAME.

SPECIFICATION forming part of Letters Patent No. 545,099, dated August 27, 1895.

Application filed July 21, 1894. Serial No. 518,241. (No specimens.)

*To all whom it may concern:*

Be it known that I, ALBRECHT SCHMIDT, a subject of the King of Prussia, residing at Berlin, Prussia, Germany, have invented certain new and useful Improvements in and Relating to the Production of Protocatechuic Aldehyde-Meta-Alkyl-Ethers to be employed in perfuming and other uses; and I do hereby declare the following to be a full, clear, and exact description of the invention, such as will enable others skilled in the art to which it appertains to make and use the same.

The method relates to the production of protocatechuic-aldehyde-meta-alkyl-ethers, and the main principle of my invention consists in substituting for the hydrogen of the hydroxyl group being in para position to the COH group of protocatechuic-aldehyde, a group that easily may be removed again—for instance, the benzyl group—i. e., at first in obtaining compounds of the type of para-benzyl-protocatechuic-aldehyde.

The method consists in the combination of the following three processes: first, converting the mono-metallic salts of protocatechuic-aldehyde into compounds of the type of para-benzyl-protocatechuic-aldehyde; secondsu b-sequently alkylating a metallic salt of these compounds of the type of para-benzyl-protocatechuic-aldehyde, and, third, separating the protocatechuic-aldehyde-meta-alkyl-ethers from the aromatic protocatechuic aldehyde-meta-alkyl-ethers so formed.

The formation of the protocatechuic aldehyde-meta-alkyl-ethers may be expressed by the following equations:

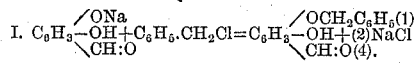
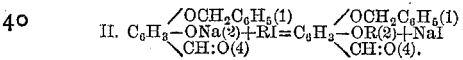
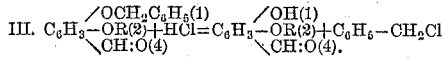

In the first operation the conversion into the above-mentioned compounds of the type of para-benzyl-para-protocatechuic-aldehyde is best effected in the following manner: One molecular proportion of alkaline hydroxid, or it may be earth alkaline hydroxid, or it may be an alkali salt or earth alkali salt of carbonic or phosphoric acid, is added to the alcoholic or watery solution of protocatechuic-aldehyde, then one molecular proportion of a compound of the type of benzyl chlorid and the whole warmed several hours on the water bath. The ether is isolated in the usual way, separated from any di-ether that is formed at the same time by dissolving in alkali liquor, and then purified either by crystallization or, preferably, by conversion into the sodium or potassium salts, which are not very soluble in aqueous alkali solutions.

In the second operation the alkylation can best be effected in the following manner: The alkali salts of the compounds of the type of para-benzyl-protocatechuic-aldehyde are treated in alcoholic solution with an alkyl haloid. In place of the alkyl haloid a salt of alkyl sulfuric acid can also be employed.

In the third operation the aromatic ethers so obtained are decomposed in a well-known way.

In carrying out my invention I proceed as follows:

I. *Production of compounds of the type of para-benzyl-protocatechuic-aldehyde.*

For example, para-benzyl-protocatechuic-aldehyde: 1.38 kilos protocatechuic-aldehyde are dissolved in about three kilos spirit, to which is added alcoholic potassium hydroxid solution containing 0.56 kilos potassium hydroxid, and 1.27 kilos benzyl chlorid are then added to the solution and the mixture warmed on the water bath for several hours. The residue obtained after evaporation of the alcohol is taken up with ether and the ethereal solution extracted with dilute caustic-soda solution. The alkaline extract can then be either supersaturated with caustic-soda solution, which precipitates the comparatively insoluble sodium salt, or it is more advantageous to first acidify, dissolve the separated cake in spirit, and add just sufficient caustic-soda solution to precipitate the sodium salt of protocatechuic-aldehyde monobenzyl-ether. The free protocatechuic-aldehyde monobenzyl-ether crystallizes out of alcohol in compact leaves and melts at 122° centigrade. The isomeric-meta-benzyl-ether that is formed at the same time melts at 113° to 114° centigrade.

The production of para-benzyzl-protocatechuic-aldehyde may also more advantageously be carried out by dissolving the potassium salt of protocatechuic-aldehyde in water and boiling it with benzyl chlorid in a return condenser.

II. *Production of aromatic ethers of the type of para-benzyl-protocatechuic-aldehyde-meta-alkyl-ether.*

1. Para-benzyl-protocatechuic-aldehyde-meta-methyl-ether: For example, 2.28 kilos para-benzyl-protocatechuic-aldehyde and 1.5 kilos methyl iodid, dissolved in ten kilos methyl alcohol, are warmed for some hours on the water bath with a solution of 0.56 kilos potassium hydroxid in methyl alcohol. The para-benzyl protocatechuic-aldehyde-meta-methyl-ether so formed is isolated in the ordinary way.

2. Para-benzyl-protocatechuic-aldehyde-meta-ethyl-ether: For example, 2.28 kilos of para-benzyl-protocatechuic-aldehyde and 1.6 kilos of ethyl iodid, dissolved in ten kilograms of ethyl alcohol, are kept for a few hours in a water bath with an alcoholic solution of caustic potash containing 0.56 kilograms of KOH. After evaporating the spirit the small portion of unattacked parabenzyl-protocatechuic-aldehyde is removed by washing the ethereal solution of the raw product with caustic-soda solution. After evaporation of the ether the para-benzyl-protocatechuic-meta-ethyl-ether remains behind as an easily-solidifying oil. This ether crystallizes from spirit into small crystals. (Melting-point, 57° centigrade.) In the same way there were obtained:

3. Para-benzyl-protocatechuic-aldehyde-meta-propyl-ether, which crystallizes from spirit into compact small crystals of rhombic appearance. (Melting-point, 74° centigrade.)

4. Para-benzyl-protocatechuic-aldehyde-meta-isopropyl-ether, (representing a thick oil.)

5. Para-benzyl-protocatechuic-aldehyde-meta-isobutyl-ether, which crystallizes from ligroin into long silk-glittering needles. (Melting-point, 42.5° centigrade.)

III. *Production of the protocatechuic-aldehyde-meta-alkyl-ethers.*

For example, analogous to the decomposition of phenylbenzyl ether one kilo of para-benzylprotocatechuic-aldehyde-meta-methyl-ether, or it may be meta-ethyl, or meta-propyl, or meta-isopropyl, or meta-isobutyl-ether, is heated on a water bath with concentrated hydrochloric acid and frequently stirred. Decomposition into benzyl chlorid and the respective protocatechuic-aldehyde-meta-alkyl-ether is thus effected. Both bodies are separated by known methods. Protocatechuic-aldehyde-meta-ethyl-ether crystallizes from water into small glittering scales. (Melting-point, 77.5° centigrade.) Protocatechuic-aldehyde-meta-propyl-ether crystallizes from water into fine needles. (Melting-point, 82° centigrade.) Protocatechuic-aldehyde-meta-isopropyl-ether represents a thick oil. Protocatechuic-aldehyde-meta-isobutyl-ether crystallizes from watery spirit into long needles. (Melting-point, 94° centigrade.) It is to be observed that para-benzyl-protocatechuic-aldehyde, as well as the compounds referred to (sub. 1, 2, 3, 4, 5) and the respective protocatechuic-aldehyde-meta-alkyl-ethers obtained thereof represent new products.

Having thus described my invention and in what manner it is to be carried out, what I claim as new therein, and desire to secure by Letters Patent, is—

The process of obtaining protocatechuic aldehyde-meta-alkyl-ethers, which consists in causing a suitable compound of the type of benzyl chlorid to act upon a monometallic salt of protocatechuic-aldehyde, alkylating a salt of the so formed compounds of the type of para-benzyl-protocatechuic-aldehyde, and separating from the compounds of the type of para-benzyl-protocatechuic aldehyde-meta-alkyl-ether thereby obtained the protocatechuic-aldehyde-meta-alkyl ethers by decomposition, such as by means of hydrochloric or hydrobromic acid, substantially as set forth.

In testimony whereof I have hereunto set my hand this 30th day of June, 1894.

ALBRECHT SCHMIDT.

Witnesses:
W. HAUPT,
E. GRUNWELL.